July 23, 1935.  A. L. MAYER  2,009,053
CAMERA
Filed June 21, 1934
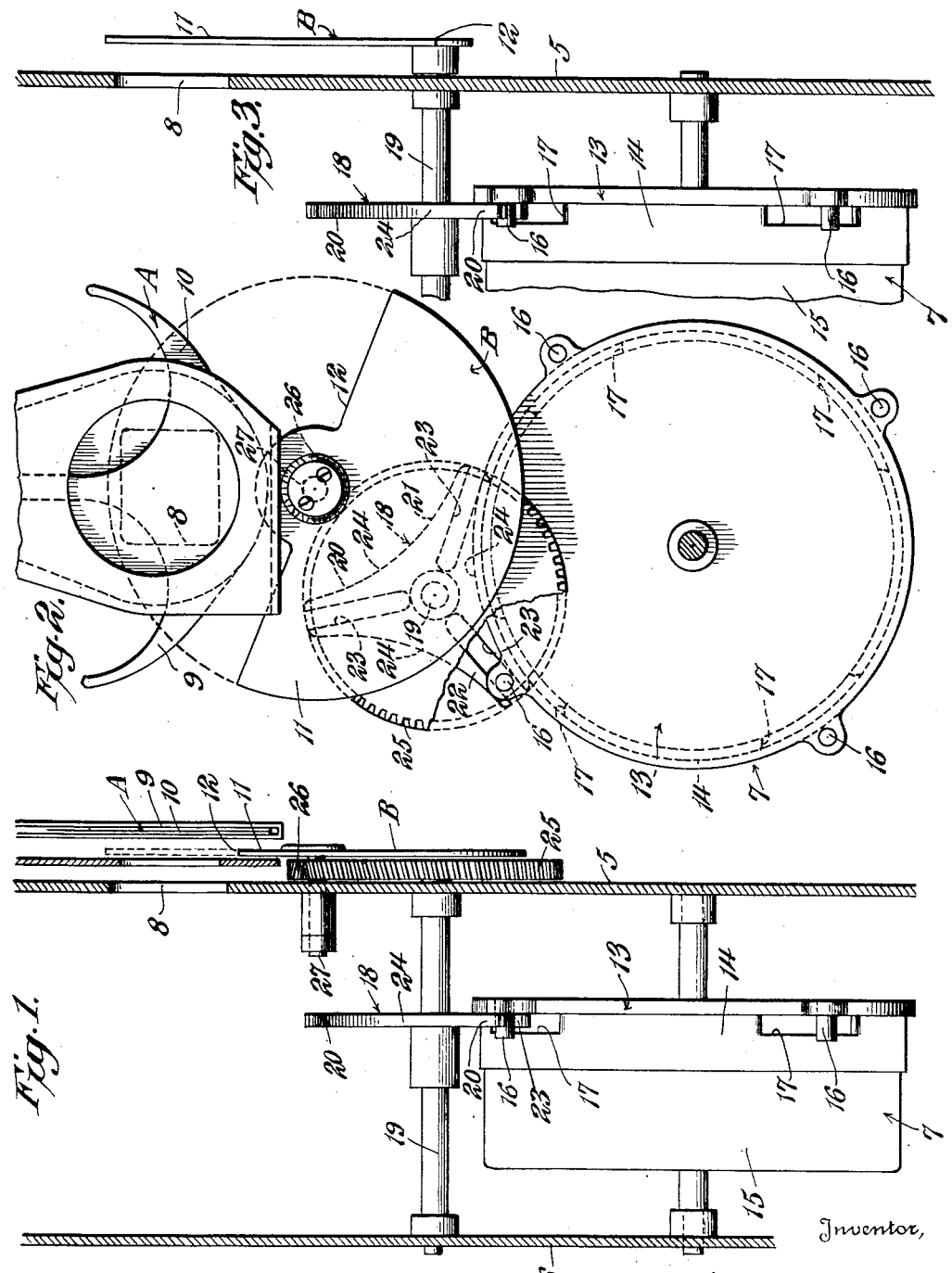
Inventor,
Alvin L. Mayer,
By Baldwin & Wight
Attorneys.

Patented July 23, 1935

2,009,053

UNITED STATES PATENT OFFICE 2,009,053

CAMERA

Alvin L. Mayer, Louisville, Ky.

Application June 21, 1934, Serial No. 731,764

2 Claims. (Cl. 88—19.3)

This invention relates to new and useful improvements in photographic cameras generally, although more particularly to means for operating the rotary shutter thereof, the invention being particularly adaptable for actuating the rotary disc or shutter of my Patent 1,966,556, issued July 17, 1934, for improvements in Camera shutters.

The principal object of my present invention is to provide means for rotating a secondary or disc shutter at an extremely high rate of speed across an exposure aperture which is intermittently formed by a primary shutter of the movable wing type.

With these and other objects in view which will more fully appear, the nature of the invention will be more clearly understood by following the description, the appended claims, and the several views illustrated in the accompanying drawing.

In the drawing:—

Figure 1 is a detail vertical section taken through a camera constructed in accordance with my invention, Figure 2 is a detail front elevation of the shutters and the driving connections between the source of power and the rotary shutter, and Figure 3 is a detail view similar to Figure 1 but showing another form of my invention.

Like reference numerals designate corresponding parts throughout the several figures of the drawing.

Referring to the accompanying drawing, the camera includes a frame having front and rear supporting plates 5, 6 and located between these plates and supported thereon is a source of power such as a spring motor 7. Formed in the front plate 5 is an opening or eye 8 through which exposures are made.

The conventional form of camera shown is similar to that disclosed in my patent above referred to, and embraces two shutters disposed in front of the eye 8 and which for the purpose of convenience are termed "primary" and "secondary" shutters. The primary shutter A which is of the intermittently movable wing type includes two swingable wings 9, 10 which are adapted to open only during the interval of exposure, whereas the secondary shutter B is of the rotary disc type and is mounted for cooperation with the primary shutter. The primary shutter A is operated by the spring motor 7 as shown in my patent and a detail description is therefore thought to be unnecessary. The secondary shutter B consists of a segmental disc 11 forming a resultant opening 12.

The shutter B is rotated very rapidly by the motor 7 through the medium of a Geneva movement which includes a driving pin wheel 13 fixed by a circular flange 14 to the motor casing 15 to rotate therewith. This pin wheel 13 carries four laterally extending pins 16 which overlie peripheral recesses 17 formed in the flange 14. A star wheel 18 is fixed to a shaft 19 located above the motor and journaled in the frame plates 5, 6. This star wheel is formed by three radial arms 20, 21 and 22, each being formed with a radial slot 23, and the wheel between the arms being concaved as at 24 to slidingly receive the flange 14. The star wheel 18 is located in cooperative relation to the pin wheel 13 so that the pins 16 will successively ride into the respective slots 23 of the star wheel. Immediately after each pin 16 enters the associated slot 23 it will be moved inwardly along the slot toward the axis of the star wheel and thereby impart a rapidly increased initial rotational movement to the wheel until the pin reaches the inner end of the slot at which time the rotational speed of the wheel is at its maximum. This maximum speed of the wheel is maintained until the pin begins its outward movement along the slot.

As shown in Figs. 1 and 2, the rotary shutter B is driven from the star wheel shaft 19 through the medium of a multiplying gear coupling which includes a large driving gear 25 fixed to the star wheel shaft 19 and a small driven gear 26 fixed on a stub shaft 27 which is journaled in the front plate 8, the shutter B being fixed to the end of said stud shaft. Consequently, the star wheel 18 will be intermittently rotated a distance of 120°, and during this period the shutter B will be rapidly rotated two or more times, the initial rotational speed of the disc being rapidly increased until it reaches maximum speed and the maximum speed being thereafter maintained.

In Figure 3, I have illustrated another form of my invention wherein the multiplying gear is dispensed with, and wherein the shutter B is fixed directly to the star wheel shaft 19.

I claim:—

1. In a camera, the combination of a primary shutter, a rotary secondary shutter, and means for rotating the latter in timed relation to the opening of the primary shutter and including a source of power, a Geneva pin wheel connected thereto, and a Geneva star wheel cooperating with the pin wheel and operatively connected to said secondary shutter.

2. In a camera, the combination of a primary shutter, a rotary secondary shutter, and means for rotating the latter in timed relation to the opening of the primary shutter and including a source of power, a Geneva pin wheel connected thereto, a Geneva star wheel cooperating with the pin wheel, and a multiplying gear connection between the star wheel and the secondary shutter.

ALVIN L. MAYER.